United States Patent
Lau et al.

(10) Patent No.: US 11,828,406 B2
(45) Date of Patent: Nov. 28, 2023

(54) HIGH LOAD DISPLAY SUPPORT SYSTEM

(71) Applicant: Colebrook Bosson & Saunders (Products) Limited, London (GB)

(72) Inventors: Alex Lau, London (GB); Kruno Knezic, London (GB)

(73) Assignee: Colebrook Bosson & Saunders (Products) Limited, London (GB)

( * ) Notice: Subject to any disclaimer, the term of this patent is extended or adjusted under 35 U.S.C. 154(b) by 0 days.

(21) Appl. No.: 17/742,941

(22) Filed: May 12, 2022

(65) Prior Publication Data

US 2022/0364676 A1 Nov. 17, 2022

Related U.S. Application Data

(60) Provisional application No. 63/187,700, filed on May 12, 2021.

(51) Int. Cl.
*F16M 11/08* (2006.01)
*F16M 11/10* (2006.01)
(Continued)

(52) U.S. Cl.
CPC ............. *F16M 11/10* (2013.01); *F16M 11/08* (2013.01); *F16M 11/2042* (2013.01);
(Continued)

(58) Field of Classification Search
CPC .... F16M 11/10; F16M 11/08; F16M 11/2042; F16M 11/2085; F16M 2200/021;
(Continued)

(56) References Cited

U.S. PATENT DOCUMENTS 3,916,967 A 11/1975 Carlisle et al.
4,266,747 A 5/1981 Souder, Jr. et al.
(Continued)

FOREIGN PATENT DOCUMENTS

WO WO2008035602 A1 3/2008
WO WO2011154703 A2 12/2011
(Continued)

OTHER PUBLICATIONS

International Search Report with Written Opinion for related Application No. PCT/GB2022/051211 dated Aug. 8, 2022, 10 Pages.

*Primary Examiner* — Terrell L Mckinnon
*Assistant Examiner* — Jerry Nmn Olivier
(74) *Attorney, Agent, or Firm* — MICHAEL BEST & FRIEDRICH LLP

(57) ABSTRACT

A support system for a display device includes a first arm configured to extend from a support surface. A second arm is rotatably connected to the first arm. The second arm has a range of movement relative to the first arm. A tilt head is rotatably connected to the second arm and configured to connect to a display. A first biasing member is positioned in the second arm and configured to provide a first counterbalancing force to the second arm to offset a load of the display. A second biasing member is positioned in the second arm and configured to provide a second counterbalancing force to the second arm to offset the load of the display. A lockout mechanism is configured to disengage the second biasing member and eliminate the second counterbalancing force through at least a portion of the range of movement.

19 Claims, 8 Drawing Sheets

(51) Int. Cl.
*F16M 11/20* (2006.01)
*F21V 21/26* (2006.01)

(52) U.S. Cl.
CPC ......... *F16M 11/2085* (2013.01); *F21V 21/26* (2013.01); *F16M 2200/021* (2013.01); *F16M 2200/041* (2013.01); *F16M 2200/06* (2013.01); *F16M 2200/063* (2013.01)

(58) Field of Classification Search
CPC ......... F16M 2200/041; F16M 2200/06; F16M 2200/063; F16M 11/2028; F16M 2200/022; F16M 2200/068; F16M 11/2021; F16M 11/2064; F16M 11/2092; F16M 11/24; F16M 13/022; F16M 11/2014; F21V 21/26
See application file for complete search history.

(56) References Cited

U.S. PATENT DOCUMENTS

| | | | |
|---|---|---|---|
| 4,447,031 A | 5/1984 | Souder et al. | |
| 5,348,260 A | 9/1994 | Acevedo | |
| 6,070,839 A | 6/2000 | Brenner et al. | |
| 6,819,550 B2 | 11/2004 | Jobs et al. | |
| 6,964,399 B1 | 11/2005 | O'Neill | |
| 7,395,995 B2 * | 7/2008 | Chen | F16M 11/2064 248/291.1 |
| 7,434,769 B1 | 10/2008 | May | |
| 7,478,786 B2 | 1/2009 | Copeland | |
| 7,562,851 B2 | 7/2009 | Hein et al. | |
| 7,637,463 B2 | 12/2009 | Yen et al. | |
| 8,181,927 B2 | 5/2012 | Farrow | |
| 8,328,151 B2 | 12/2012 | Gwag | |
| D688,674 S | 8/2013 | Lau et al. | |
| 8,585,001 B2 | 11/2013 | Huang | |
| 8,777,172 B2 | 7/2014 | Sapper et al. | |
| 8,876,074 B2 * | 11/2014 | Chen | F16M 11/2064 248/284.1 |
| 8,931,748 B2 | 1/2015 | Bowman et al. | |
| 9,004,431 B2 | 4/2015 | Huang | |
| D740,830 S | 10/2015 | Chu | |
| 9,936,593 B2 | 4/2018 | Deily et al. | |
| 9,993,071 B2 | 6/2018 | Hung | |
| D834,030 S | 11/2018 | Lindo et al. | |
| 10,159,158 B2 | 12/2018 | Park et al. | |
| 10,172,248 B1 | 1/2019 | Park et al. | |
| 10,274,131 B2 | 4/2019 | Petts et al. | |
| D847,823 S | 5/2019 | Monsalve et al. | |
| D848,444 S | 5/2019 | Jung et al. | |
| 10,309,578 B2 | 6/2019 | Yen et al. | |
| 10,317,058 B2 | 6/2019 | Hung et al. | |
| 10,345,851 B2 | 7/2019 | Park et al. | |
| 10,487,974 B2 | 11/2019 | Sherman | |
| 10,801,660 B1 | 10/2020 | Liu | |
| 10,845,000 B2 | 11/2020 | Lau | |
| 10,851,938 B2 | 12/2020 | Glickstein et al. | |
| D910,028 S | 2/2021 | Pelly et al. | |
| 2006/0157627 A1 | 7/2006 | Hung | |
| 2007/0001076 A1 | 1/2007 | Asamarai et al. | |
| 2007/0153459 A1 | 7/2007 | Wohlford et al. | |
| 2011/0260017 A1 | 10/2011 | Monsalve et al. | |
| 2012/0138754 A1 | 6/2012 | Lim | |
| 2019/0301670 A1 | 10/2019 | Glickstein et al. | |
| 2020/0116301 A1 | 4/2020 | Luo | |

FOREIGN PATENT DOCUMENTS

| | | |
|---|---|---|
| WO | WO2013171502 A1 | 11/2013 |
| WO | WO2018141000 A1 | 8/2018 |

* cited by examiner

HIGH LOAD DISPLAY SUPPORT SYSTEM

RELATED APPLICATION(S)

This application is based on U.S. Provisional Application Ser. No. 63/187,700, filed May 12, 2021, the disclosure of which is incorporated herein by reference in its entirety and to which priority is claimed.

FIELD

Various exemplary embodiments relate to a support system used to moveably support electronic displays such as monitors or TVs.

BACKGROUND

Modern screen-based display devices are typically flat-screen displays mounted on elevated support devices. Certain support devices utilize a moveable support arm which can then be secured to a surface such that the display is held above or in front of the surface. Typical display support devices have a weight limit in a range sufficient for standard displays, for example in the range of 0 to 9 kg, which may be sufficient for monitors up to 27 inches. An example of such a support system is shown in U.S. Pat. No. 9,316,346, the disclosure of which is incorporated herein by reference in its entirety.

If a larger display outside of the standard weight range is used with a standard arm, the counterbalancing force provided by the arm can be overcome by the weight of the display. This can result in the arm being unable to support the display in a position desired by a user. Accordingly, larger displays are typically supported by static mounts, which limits the positioning and flexibility provided by moveable supports.

SUMMARY

In certain configurations a support system for a display device includes a first arm configured to extend from a support surface. A second arm is rotatably connected to the first arm. The second arm has a range of movement relative to the first arm. A tilt head is rotatably connected to the second arm and configured to connect to a display. A first biasing member is positioned in the second arm and configured to provide a first counterbalancing force to the second arm to offset a load of the display. A second biasing member is positioned in the second arm and configured to provide a second counterbalancing force to the second arm to offset the load of the display. A lockout mechanism is configured to disengage the second biasing member and eliminate the second counterbalancing force through at least a portion of the range of movement.

In certain configurations the lockout mechanism moves a portion of the second biasing member relative to the first biasing member to prevent the second counterbalancing force from acting with the first counterbalancing force.

In certain configurations the first biasing member is connected to a first bracket and the second biasing member is connected to a second bracket, and the lockout mechanism is configured to move the second bracket relative to the first bracket to disengage the second biasing member.

In certain configurations the second arm is rotatably connected to the first arm about a first axis, and wherein a link has a first end positioned on the first bracket and a second end positioned below the second axis.

In certain configurations the first biasing member is positioned in a first casing and the second biasing member is positioned in a second casing, and wherein the lockout mechanism is configured to move the second casing relative to the first casing to disengage the second biasing member.

In certain configurations the second casing is slidably connected to the second arm.

In certain configurations the lockout mechanism includes a rotatable member.

In certain configurations an adjustment mechanism is configured to vary the amount of the first counterbalancing force provided by the first biasing member.

In certain configurations a support system for display device includes a first arm configured to extend from a support surface. A second arm is rotatably connected to the first arm. The second arm has a range of movement relative to the first arm. A tilt head is rotatably connected to the second arm and configured to connect to a display. A first spring casing is positioned in the second arm. A first spring is positioned in the first spring casing. A second spring casing is positioned in the second arm. A second spring is positioned in the second spring casing. The second spring casing is moveable from a first position engaged with the first spring casing to a second position disengaged with the first spring casing.

In certain configurations a lockout mechanism is connected to the second spring casing to move the second spring casing between the first position and the second position.

In certain configurations the lockout mechanism includes a rotatable member accessible by a user to adjust the position of the second spring casing.

In certain configurations the first spring casing is connected to a first bracket and the second spring casing is connected to a second bracket, and the second bracket is engaged with the first bracket in the first position and the second bracket is disengage with the second bracket in the second position.

In certain configurations the first spring casing includes a first groove and the second arm includes a first rail mating with the first groove.

In certain configurations the first spring casing includes a projection having a front wall and the second spring casing includes a rear wall mating with the front wall.

In certain configurations an adjustment mechanism is configured to vary the amount of the first counterbalancing force provided by the first biasing member.

In certain configurations a support system for display device includes a first arm configured to extend from a support surface. A second arm is rotatably connected to the first arm. The second arm has a range of movement relative to the first arm. A tilt head is rotatably connected to the second arm and configured to connect to a display. A first casing is positioned in the second arm. A first bracket is connected to the first casing. A first biasing member is positioned in the first casing and configured to provide a first counterbalancing force to the second arm to offset a load of the display. A second casing is positioned in the second arm. A second bracket is connected to the second casing. A second biasing member is positioned in the second casing and configured to provide a second counterbalancing force to the second arm to offset the load of the display. A lockout mechanism is configured to disengage the second biasing member and eliminate the second counterbalancing force through at least a portion of the range of movement.

In certain configurations the lockout mechanism is configured to move the second casing and the second bracket in the second arm relative to the first casing and the first bracket.

In certain configurations the lockout mechanism includes a rotatable member accessible to a user through an opening in the second arm.

In certain configurations a fastener extends through the second casing and the second bracket, and wherein the lockout mechanism is threadably connected to the fastener.

In certain configurations the second arm is rotatably connected to the first arm about a first axis, and wherein a link has a first end positioned on the first bracket and a second end positioned below the second axis.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Certain exemplary configurations of a display support system are directed to a moveable arm support that is configured to support heavier displays than can be typically supported by traditional moveable support arms. Further, certain configurations provide one or more force adjustments mechanisms to allow a user to modify the counterbalancing force of the arm as needed.

Figure 1:
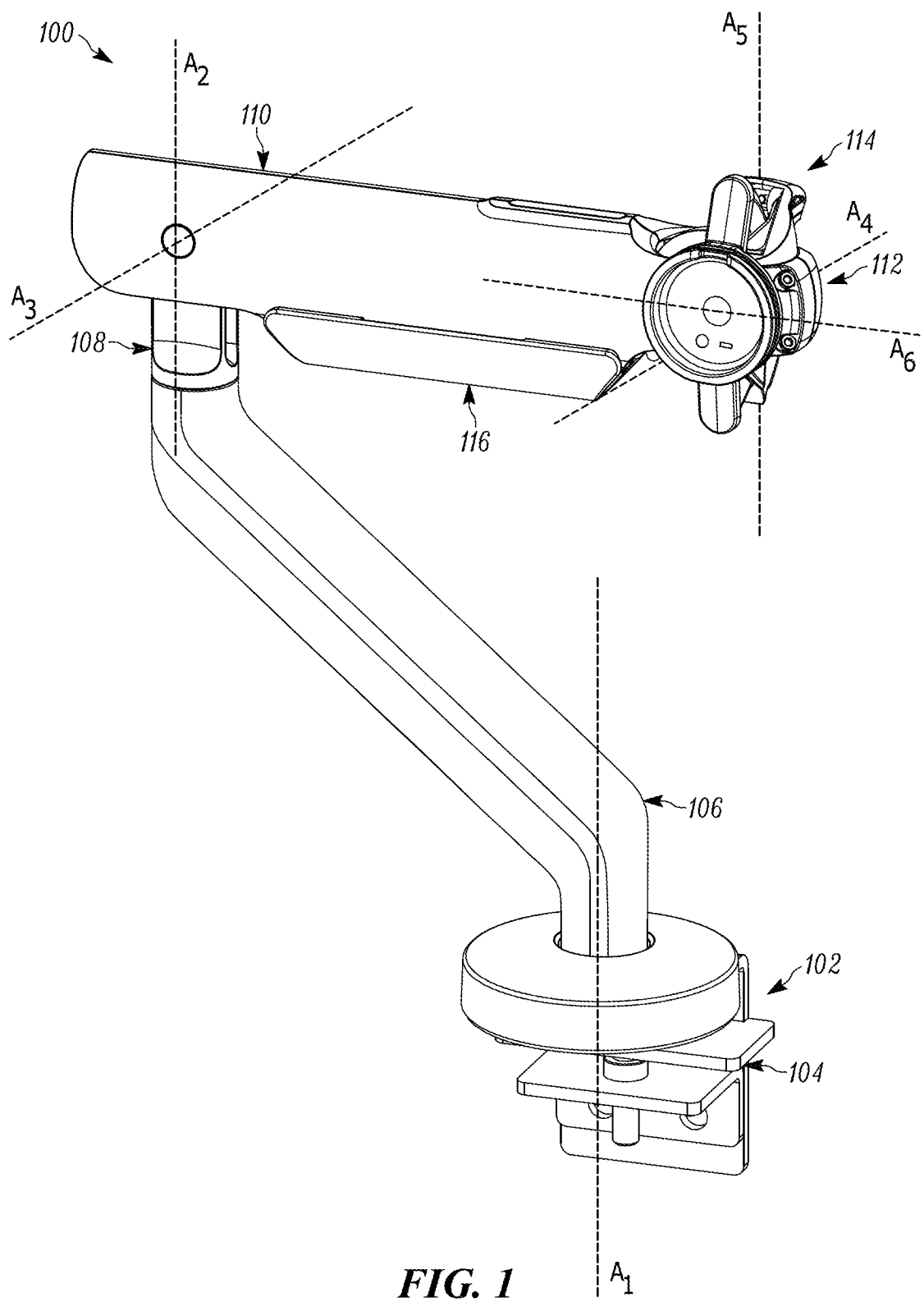
FIG. 1 is an isometric view of a support system for a display.

FIG. 1 shows an exemplary embodiment of a support system 100 for a display that includes a mounting portion 102. The mounting portion 102 is configured to secure the support system 100 to a support surface (not shown). The mounting portion 102 can include a clamp member 104 that can be connected to various surfaces or supports, such as desk, tables, walls, etc. as would be understood by one of ordinary skill in the art. A first arm 106 extends from the mounting portion 102. In certain configurations the first arm 106 is rotatably connected to the mounting portion. A mid joint 108 is rotatably connected to a distal portion of the first arm 106. A second arm 110 is rotatably connected to the mid joint 108. A head joint 112 is rotatably connected to the distal portion of the second arm 110. A tilt mechanism 114 is moveably connected to the head joint 112. A display mount (not shown) for example a VESA type display mount can be connected to the tilt mechanism 114 to receive a display or a display can be directly connected to the tilt mechanism. Each of the first arm 106, mid joint 108, second arm 110, head joint 112, and tilt mechanism 114 can include single or multi piece housings components, for example where first and second pieces are connected to one another. Other housing pieces can be connected as needed. One or more cable management devices 116 can be positioned on one or more of the arms to organize and retain cables running to the display. The first arm 106, mid joint 108, second arm 110, head joint 112, and tilt mechanism 114 make up an exemplary embodiment of a support structure, although other variations of support structures may also be used.

As best shown in FIG. 1, the first arm 106 can rotate relative to the support or surface about a first vertical axis A1. The mid joint 108 can rotate relative to the first arm 106 about a second axis A2. The second arm 110 can rotate relative to the mid joint 108 about a third axis A3. The head joint 112 can rotate relative to the second arm 110 about a fourth axis A4. The tilt mechanism 114 can rotate relative to the head joint 112 about a fifth axis A5 and about a sixth axis A6. In the illustrated embodiment, the first axis A1 and the second axis A2 are vertical axes. The third axis A3 and the fourth axis A4 are horizontal axes. The fifth axis A5 is a vertical axis and the sixth axis A6 is a horizontal axis. In an exemplary embodiment the sixth axis A6 is a vertical axis spaced from tilt mechanism 114 to extend either through the display mount or a portion of a display connected thereto.

Figure 2:
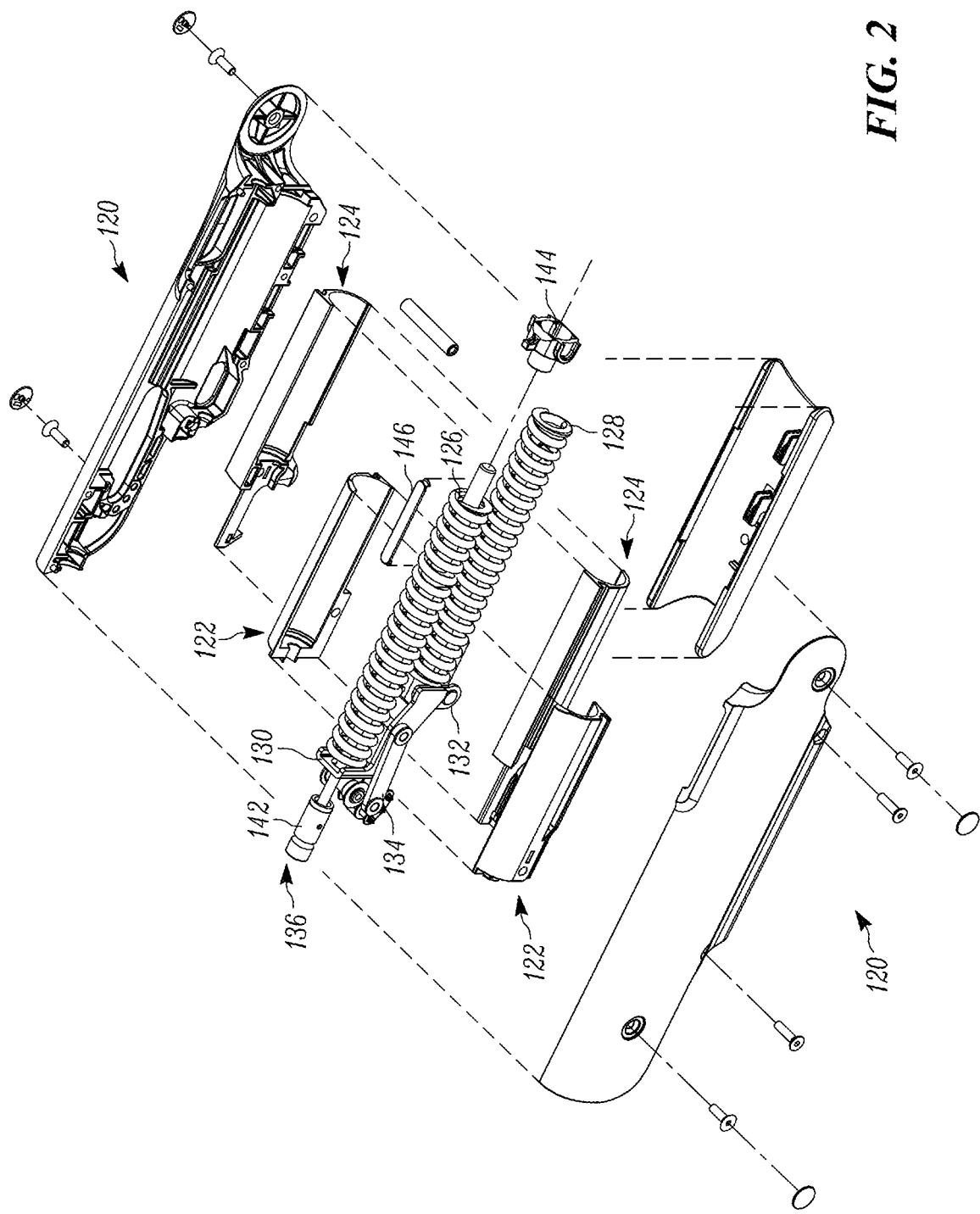
FIG. 2 is a partially exploded view of the second arm of the support system.
Figure 3:
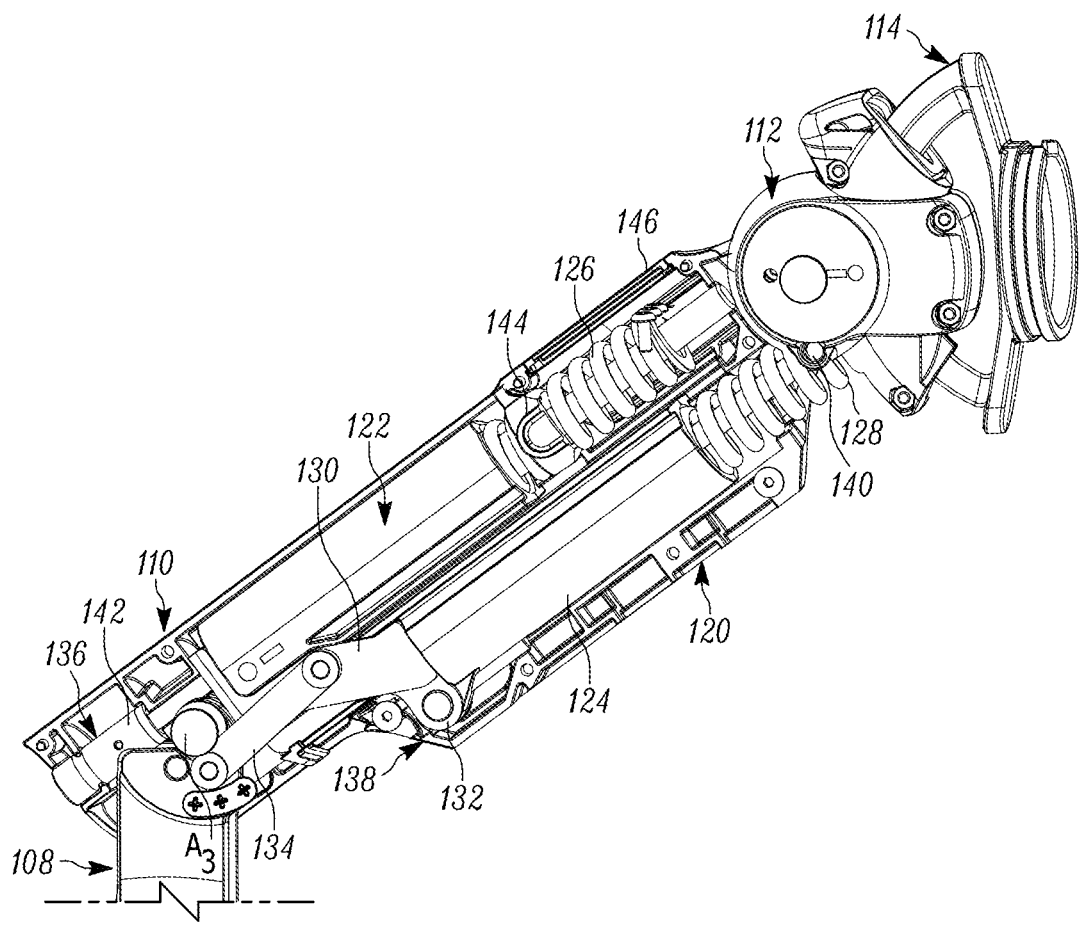
FIG. 3 is a side view of the second arm with a housing member removed.

FIGS. 2 and 3 show an exemplary set of components of the second arm 110 which can include a housing 120. The housing 120 retains a first spring casing 122 and a second spring casing 124. A first spring 126 is positioned in the first spring casing 122 and a second spring 128 is positioned in the second spring casing 124. A first spring bracket 130 is connected to the first spring casing 122 and a second spring bracket 132 is connected to the second spring casing 124. A pair of spring links 134 are connected to the first spring bracket 130 and to the mid joint 108. In certain configurations, the spring links 134 can be connected to the mid joint 108 below the rotatable connection between the second arm 110 and the mid joint 108 about the third axis A3. A first spring adjustment mechanism 136 is positioned in the housing 120 and extends into the first spring casing 122. A lockout mechanism 138 is positioned in the housing 120 and is engaged with the second spring casing 124.

In certain configurations, a direct link 140 has a first portion pivotally connected to the mid joint 108 and a second portion pivotally connected to the head joint 112. The direct link 140 can extend through the housing 120, passing through the second spring casing 124 and the second spring 128. During movement of the second arm 110 from a raised position to a lowered position, the direct link 140 caused rotation of the head joint 112 about the horizontal axis A4 so that an attached display will maintain a relative position to the support surface during rotation of the second arm 110.

In the illustrated embodiment, the first spring 126 and the second spring 128 are coil springs that exert a biasing force relative to their compression. This force is exerted on the first and second spring brackets 130, 132 and transferred to the mid joint 108 via the spring links 134. This force is used to offset the downward force on the second arm 110 applied by a load of a display connected thereto.

The illustrated embodiment depicts the first and second springs 126, 128 as upper and lower springs relative to the housing 120. Other embodiments can incorporate different positions and configurations for the first and second springs 126, 128 to provide a counterbalancing first to the arm 110. Other embodiments can also utilize different biasing members as necessary.

The first spring adjustment mechanism 136 can include a shaft 142 connected to an adjustable plate 144. The first spring 126 abuts the adjustable plate 144 at a distal end relative to the mid joint 108. The adjustable plate 144 can be threadably engaged with the shaft 142 and keyed to the housing 120 so that rotation of the shaft 142 causes translation of the adjustable plate 144 in the housing 120. The shaft 142 can be rotated by a user to move the adjustable plate 144 as desired or needed depending on the weight of the display. The shaft 142 can have a rear portion that is accessible to a user through an opening in the housing 120. The shaft 142 can include a user interface (e.g., thumb wheel, hex socket, etc.) that allows for user engagement and rotation. A window 146 can be provided in the housing 120 to allow a user to view the position of the adjustable plate 144. One or more indicators can be provided on the window 146 or the adjacent housing 120 to allow a user to more easily judge adjustment amounts and position of the plate 144.

The lockout mechanism 138 is configured to disengage the second spring 128 to reduce or remove the counterbalancing force provided by the second spring 128. In certain configurations, the lockout mechanism 138 can disengage the second spring 128 so that no biasing force is transferred from the second spring 128 to offset an attached load through at least a portion of the travel distance of the second arm 110.

Although the illustrated embodiment shows the first spring adjustment mechanism 136 associated with an upper spring and the lockout mechanism 138 associated with a lower spring, these components can be reversed or moved to other positions dependent on different spring configurations.

Figure 4:
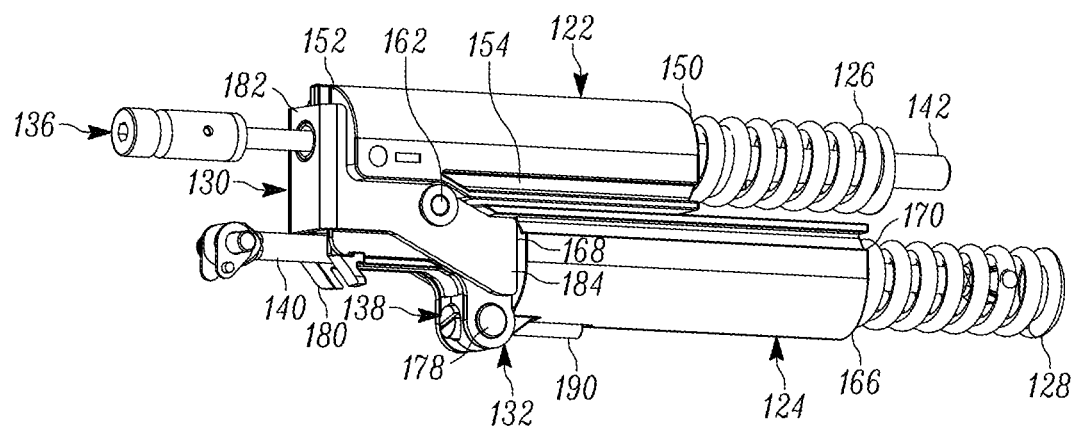
FIG. 4 is a rear isometric view of components of a biasing system of the second arm.
Figure 5:
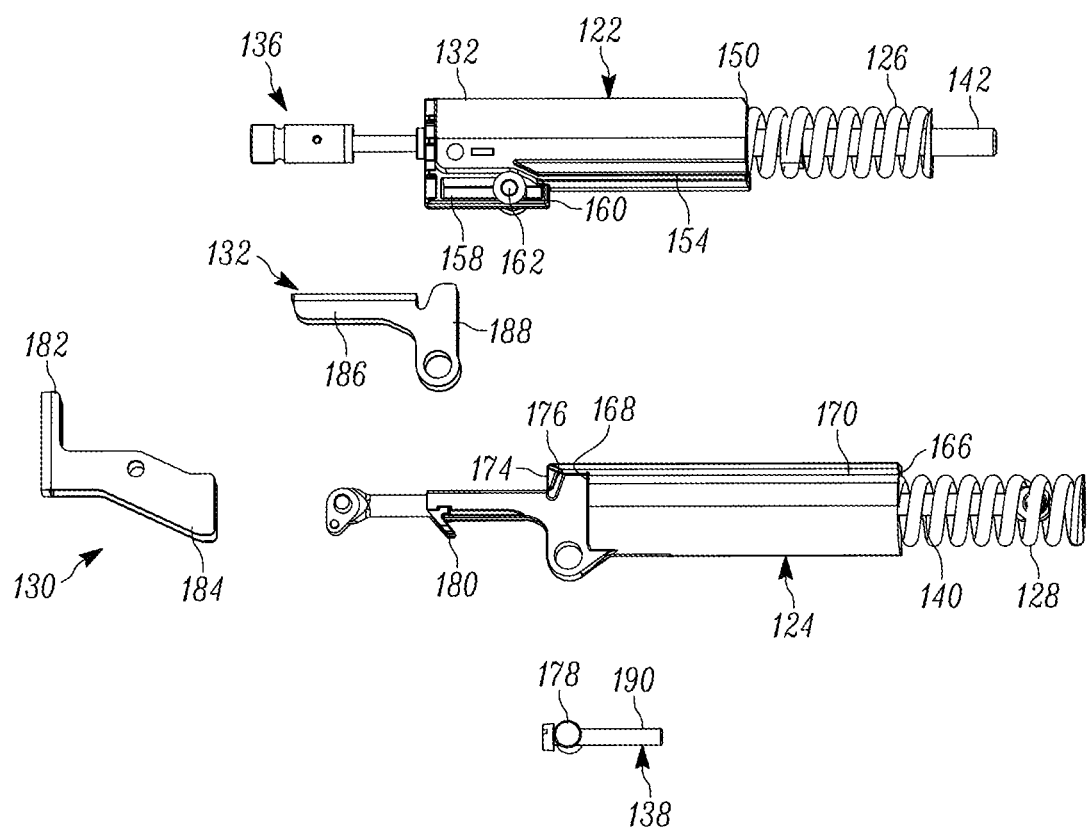
FIG. 5 is a partially exploded view of the components of FIG. 4.

FIGS. 4 and 5 show an exemplary embodiment of the first and second spring casings 122, 124, the first and second spring brackets 130, 132, and the spring lockout mechanism 138. In certain configurations, the second spring casing 124 and the second spring bracket 132 will engage the first spring casing 122 and the first spring bracket 130 to provide a combined biasing force of both the first and second springs 126, 128 to the spring links 134. The second spring casing 124 is moveable relative to the first spring casing 122 by the lockout mechanism 138 so that the second spring casing 124 and the second spring bracket 132 disengage the first spring casing 122 and the first spring bracket 130 through at least a portion of the rotational movement of the second arm 110 relative to the mid joint 108.

In certain configurations, the first spring casing 122 has a substantially open first end 150 through which the first spring 126 extends. The first spring 126 can be seated against a substantially closed second end 152 of the spring casing. The upper portion of the first spring casing 122 has a curved configuration, although different shapes and sizes can be used depending on the outer or inner surface structure of the housing 120.

Figure 6:
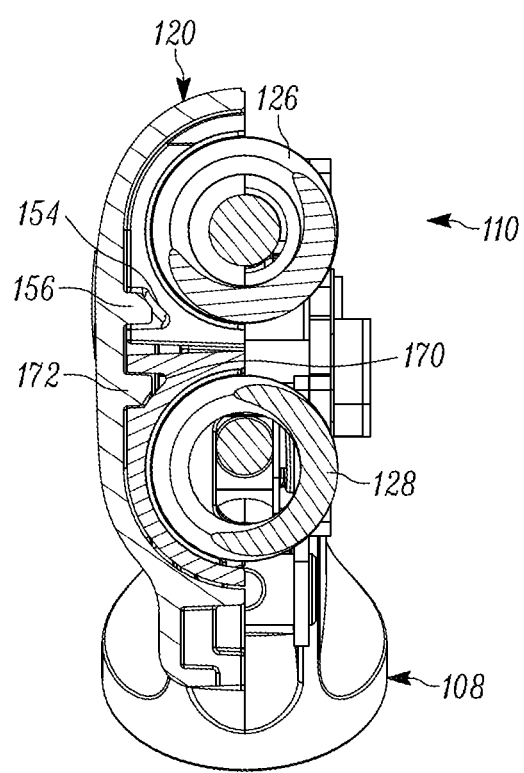
FIG. 6 is a front, sectional view of the second arm.

The lower portion of the first spring casing 122 includes one or more grooves 154 extending into an outer surface of, and along at least a portion of, the first spring casing 122. The grooves 154 can be positioned on each side of the first spring casing 122. As best shown in FIG. 6, the groove 154 receives a first rail 156 formed on the housing 120. Although only a single side is shown, the second side can have an identical configuration. The slidable engagement of the rails 156 and the grooves 154 allows the first spring casing 122 to translate relative to the housing 120. This translation helps minimize or eliminate any bending or twisting forces created by the first spring 126 during movement of the second arm 110 or the components of the housing and ensuring smooth movement of the second arm 110.

The lower portion of the first spring casing 122 also includes base having a protrusion 158 extending below the groove 154 and toward the rear of the first spring casing 122. The protrusion 158 can include a front wall 160. An opening is formed in the protrusion 158 for receiving a fastener 162 to connect the first spring bracket 130 to the first spring casing 122. In certain configurations the fastener 162 fixes the horizontal position of the first spring casing 122 and the first spring bracket 130 relative to each other. The fastener 162 is shown as a horizontally extending pin, although other fasteners or different mechanical connections can be used.

In certain configurations, the second spring casing 124 has a substantially open first end 166 through which the second spring 128 extends. The second spring 128 can be seated against a substantially closed second end portion 168 of the second spring casing 124. The lower portion of the second spring casing 124 has a curved configuration, although different shapes and sizes can be used depending on the outer or inner surface structure of the housing.

The upper portion of the second spring casing 124 includes one or more grooves 170 extending into an outer surface of, and along at least a portion of, the second spring casing 124. The grooves can be positioned on each side of the second spring casing. As best shown in FIG. 6, the grooves 170 receive a second rail 172 on the housing 120. The slidable engagement of the rails 172 and the grooves 170 allows the second spring casing 124 to translate relative to the housing 120. This translation helps minimize or eliminate any bending or twisting forces created by the second spring 128 during movement of the second arm 110 or the components of the housing 120 and ensuring smooth movement of the second arm 110.

The upper portion of the second spring casing 124 also includes a rear wall 174. When assembled, the rear wall 174 of the second spring casing 124 is aligned with the front wall 160 of the first spring casing 122. A rear protrusion 176 extends outwardly from the rear wall 174. When assembled, the rear protrusion 176 engages the second spring bracket 132. An opening can be formed in the second spring casing 124 for receiving a fastener 178 to connect the second spring bracket 132 to the second spring casing 124. In certain configurations the fastener 178 fixes the horizontal position of the second spring casing 124 and the second spring bracket 132 relative to each other. The fastener 178 is shown as a horizontally extending pin, although other fasteners or different mechanical connections can be used.

In certain configurations the second spring casing 124 includes one or more flanges 180 extending at an oblique angle downwardly and away from an end portion of the second spring casing 124. A pair of flanges 180 can be used that straddle either side of the direct link 140. These flanges 180 can extend outside of the housing 120 to be visible by the user to determine a position of the second spring casing 124 as set by the lockout mechanism 138. The angle of the flanges 180 can be configured to provide clearance for movement of the second arm 110 relative to the first arm 106 and the mid joint 108.

In certain configurations, the first spring bracket 130 includes a wall 182 and a pair of arms 184 extending from the wall 182. The rear end of the first spring bracket 130 can be engaged with the wall 182. The wall 182 can include an opening that allows for passage of the adjustment mechanism 136. The first and second arms 184 can be positioned to extend outside of the first spring casing 122. An opening is provided in each of the first and second arms 184 to receive the fastener 162 to connect the first spring bracket 130 to the first spring casing 122.

In certain configurations, the second spring bracket 132 includes a base 186 and a pair of arms 188 extending from the base 186. A slot can be formed between the base 186 and the arms 188 to receive the protrusions 176 of the second spring casing 124. An opening is provided in each of the arms 188 to receive the fastener 178 to connect the second spring bracket 132 to the second spring casing 124.

In certain configurations the lockout mechanism 138 includes a rotatable member 190 connected to the fastener 178 of the second spring casing 124. The rotatable member 190 can be threadably connected to the fastener 178 that connects the second spring bracket 132 to the second spring casing 124. The housing 120 can be configured to limit movement of the rotatable member 190 in at least one axial direction. In the illustrated embodiment, the rotatable member 190 includes a head which is captured by one or more protrusions formed in the housing 120 to limit rearward movement of the rotatable member 190 as best shown in FIG. 3. The lockout mechanism 138 in connection with the second spring casing 124 can be moveable in the forward direction during movement of the second arm 110 from a raised position to a lowered position.

The rotatable member 190 can have a user interface (e.g., thumb wheel, hex socket, etc.) that allows for user engagement and rotation. The user can rotate the rotatable member 190 which causes translation of the fastener 178 in the axial direction of the rotatable member 190. Movement of the fastener 178 causes corresponding movement of the second spring bracket 132 and the second spring casing 124 toward and away from the first spring bracket 130 and first spring casing 122. The housing 120 can have one or more slots or grooves 194 formed therein to provide limited movement of the second spring bracket 132 and second spring casing 124 relative to the housing 120.

Figure 7:
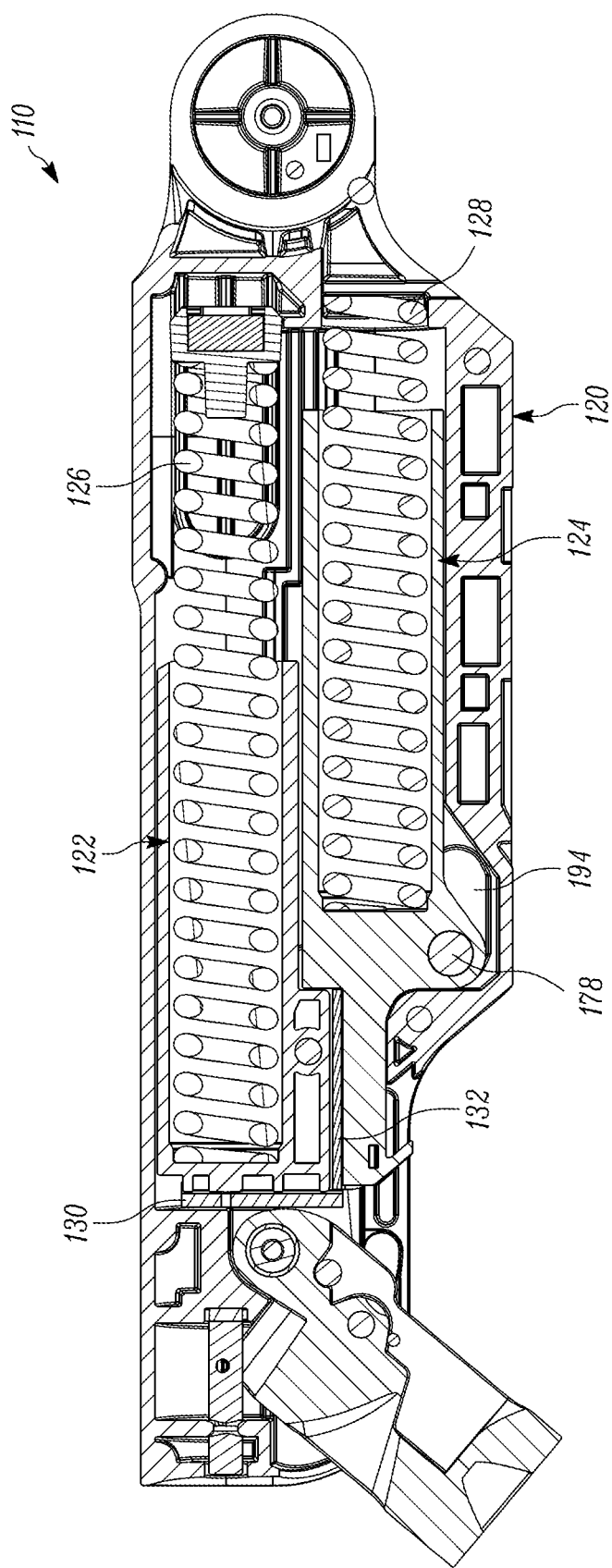
FIG. 7 is a side, sectional view of the second arm with the second spring engaged.

As best shown in FIG. 7, in certain embodiments when the lockout mechanism 138 is disengaged the second spring bracket 132 is engaged with the first spring bracket 130 and the second spring casing 124 is engaged with the first spring casing 122, although only one engagement can be used. In this configuration, the force of the first spring 126 and the second spring 128 is applied to the spring links 134 to counterbalance the load of the display.

Figure 8:
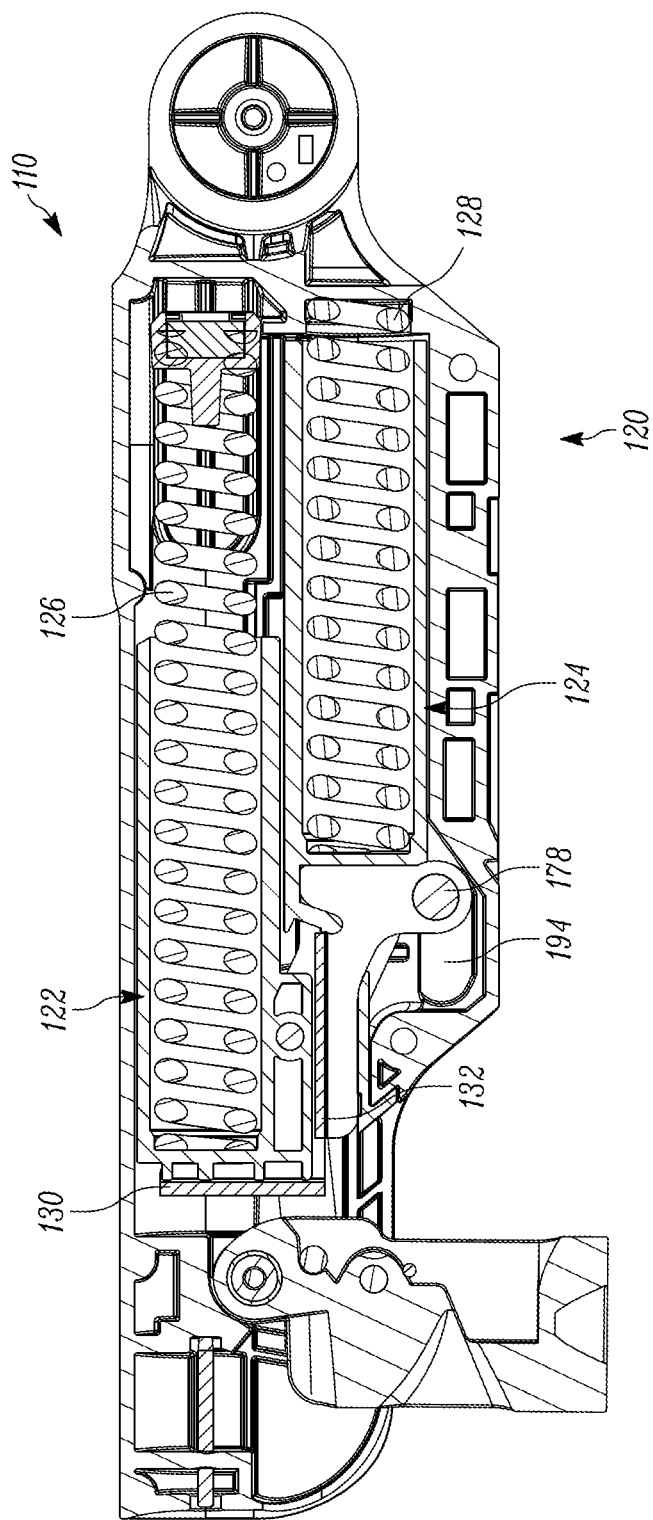
FIG. 8 is a side, sectional view of the second arm with the second spring disengaged.

In some applications, the weight of the display may not require the force of both springs 126, 128. In such instances, the user can engage the lockout mechanism 138, driving the fastener 178 forward. This will move the second spring bracket 132 and the second spring casing 124 forward, out of engagement with the first spring bracket 130 and first spring casing 122 through at least a portion of the movement of the second arm as shown in FIG. 8.

In certain configurations, when the arm is in the lowermost position, the first spring casing 122 can be driven forward by the spring links 134 so that first spring bracket 130 and first spring casing 122 are engaged with the second spring bracket 132 and the second spring casing 124 even as lockout mechanism 138 is fully engaged. In certain configurations, the lockout mechanism 138 can be used to position the second spring casing 124 so that the second spring 128 will be engaged at a certain point of travel (e.g., at a mid position) for the second arm 110 as it rotates relative to the first arm 106.

Although the exemplary embodiment described above involves moving the second spring casing 124 to disengage the second spring 128, other contemplated embodiments can utilize different mechanisms to disengage the second spring 128. For example, a separate plate or other member can be positioned to disengage the spring such as by moving the rear end of the spring inside of the housing. Such a plate can be positioned in the casing or can be used in the housing separate from a casing.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed is:

1. A support system for a display comprising:
   a first arm configured to extend from a support surface;
   a second arm rotatably connected to the first arm, the second arm having a range of movement relative to the first arm;
   a tilt head rotatably connected to the second arm and configured to connect to the display;
   a first biasing member positioned in the second arm and configured to provide a first counterbalancing force to the second arm to offset a load of the display;
   a second biasing member positioned in the second arm and configured to provide a second counterbalancing force to the second arm to offset the load of the display; and
   a lockout mechanism configured to disengage the second biasing member and eliminate the second counterbalancing force through at least a portion of the range of movement,
   wherein the first biasing member is connected to a first bracket and the second biasing member is connected to a second bracket, and wherein the lockout mechanism is configured to move the second bracket relative to the first bracket to disengage the second biasing member.

2. The support system of claim 1, wherein the lockout mechanism moves a portion of the second biasing member relative to the first biasing member to prevent the second counterbalancing force from acting with the first counterbalancing force.

3. The support system of claim 1, wherein the second arm is rotatably connected to the first arm about a first axis, and wherein a link has a first end positioned on the first bracket and a second end positioned below the first axis.

4. The support system of claim 1, wherein the first biasing member is positioned in a first casing and the second biasing member is positioned in a second casing, and wherein the lockout mechanism is configured to move the second casing relative to the first casing to disengage the second biasing member.

5. The support system of claim 4, wherein the second casing is slidably connected to the second arm.

6. The support system of claim 1, wherein the lockout mechanism includes a rotatable member.

7. The support system of claim 1, wherein an adjustment mechanism is configured to vary the amount of the first counterbalancing force provided by the first biasing member.

8. A support system for a display comprising:
   a first arm configured to extend from a support surface;
   a second arm rotatably connected to the first arm, the second arm having a range of movement relative to the first arm;
   a tilt head rotatably connected to the second arm and configured to connect to the display;
   a first spring casing positioned in the second arm;
   a first spring positioned in the first spring casing;
   a second spring casing positioned in the second arm; and
   a second spring positioned in the second spring casing;
   wherein the second spring casing is moveable from a first position engaged with the first spring casing to a second position disengaged with the first spring casing.

9. The support system of claim 8, wherein a lockout mechanism is connected to the second spring casing to move the second spring casing between the first position and the second position.

10. The support system of claim 9, wherein the lockout mechanism includes a rotatable member accessible by a user to adjust the position of the second spring casing.

11. The support system of claim 8, wherein the first spring casing is connected to a first bracket and the second spring casing is connected to a second bracket, and wherein the second bracket is engaged with the first bracket in the first position and the second bracket is disengage with the second bracket in the second position.

12. The support system of claim 8, wherein the first spring casing includes a first groove and the second arm includes a first rail mating with the first groove.

13. The support system of claim 8, wherein the first spring casing includes a projection having a front wall and the second spring casing includes a rear wall mating with the front wall.

14. The support system of claim 8, wherein an adjustment mechanism is configured to vary the amount of a first counterbalancing force provided by the first spring.

15. A support system for a display comprising:
   a first arm configured to extend from a support surface;
   a second arm rotatably connected to the first arm, the second arm having a range of movement relative to the first arm;
   a tilt head rotatably connected to the second arm and configured to connect to the display;
   a first casing positioned in the second arm;
   a first bracket connected to the first casing;
   a first biasing member positioned in the first casing and configured to provide a first counterbalancing force to the second arm to offset a load of the display;
   a second casing positioned in the second arm; and
   a second bracket connected to the second casing;
   a second biasing member positioned in the second casing and configured to provide a second counterbalancing force to the second arm to offset the load of the display; and
   a lockout mechanism configured to disengage the second biasing member and eliminate the second counterbalancing force through at least a portion of the range of movement.

16. The support system of claim 15, wherein the lockout mechanism is configured to move the second casing and the second bracket in the second arm relative to the first casing and the first bracket.

17. The support system of claim 15, wherein the lockout mechanism includes a rotatable member accessible to a user through an opening in the second arm.

18. The support system of claim 15, wherein a fastener extends through the second casing and the second bracket, and wherein the lockout mechanism is threadably connected to the fastener.

19. The support system of claim 15, wherein the second arm is rotatably connected to the first arm about a first axis, and wherein a link has a first end positioned on the first bracket and a second end positioned below the first axis.

* * * * *